Nov. 9, 1954

E. M. SIMPSON 2,693,969

FLEXIBLE TRACTOR PLANTER COUPLING DEVICE

Filed Nov. 13, 1951

Emmett M. Simpson
INVENTOR.

BY *Clarence A. O'Brien
and Harvey B. Jacobson*
Attorneys

Nov. 9, 1954

E. M. SIMPSON 2,693,969

FLEXIBLE TRACTOR PLANTER COUPLING DEVICE

Filed Nov. 13, 1951

Emmett M. Simpson
INVENTOR.

BY Clarence A. O'Brien
and Harvey B. Jackson
Attorneys

Nov. 9, 1954
E. M. SIMPSON
2,693,969
FLEXIBLE TRACTOR PLANTER COUPLING DEVICE
Filed Nov. 13, 1951
3 Sheets-Sheet 3
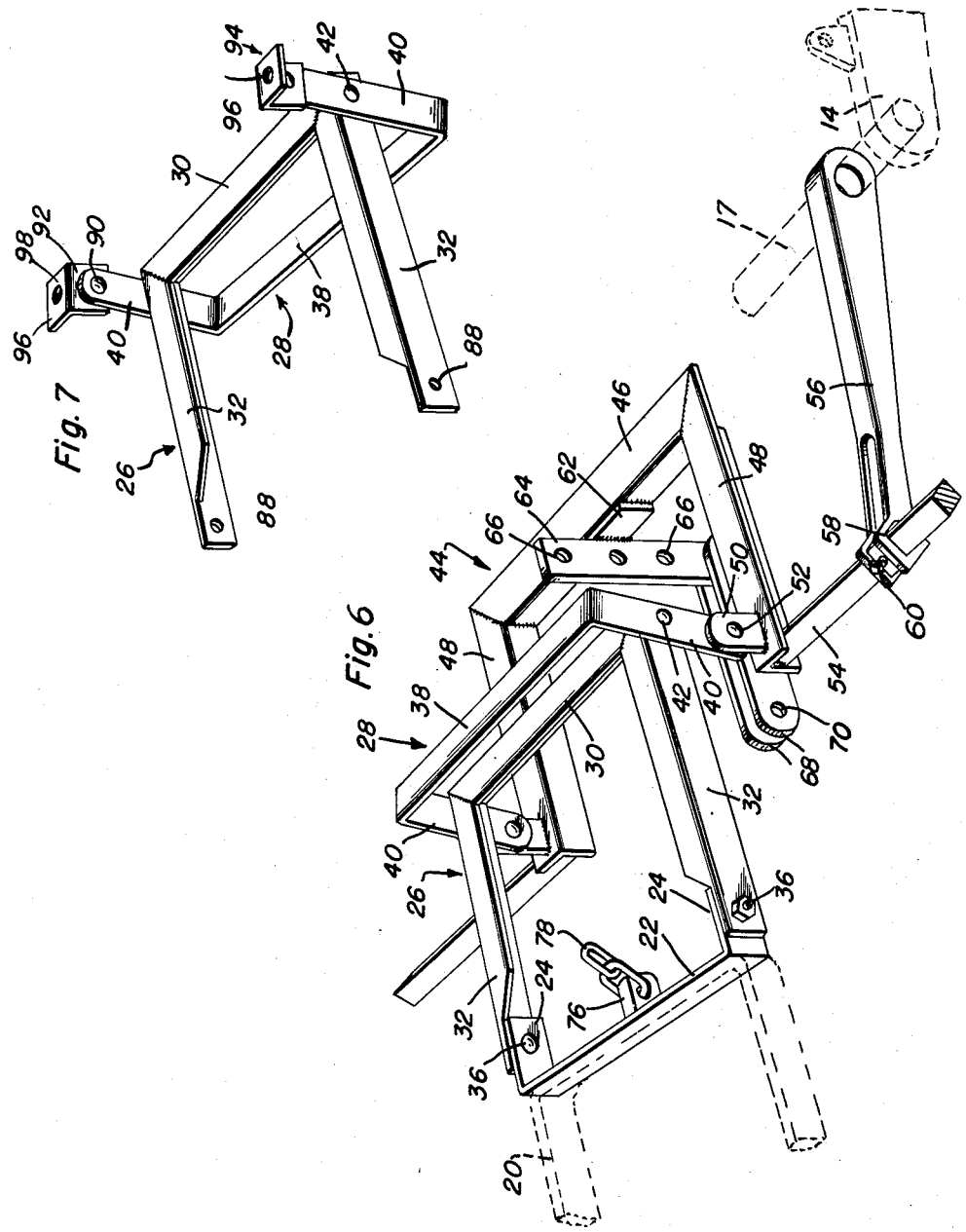
Emmett M. Simpson
*INVENTOR.*
BY *Clarence A. O'Brien
and Harvey B. Jacobson*
Attorneys

United States Patent Office 2,693,969
Patented Nov. 9, 1954

2,693,969

FLEXIBLE TRACTOR PLANTER COUPLING DEVICE

Emmett M. Simpson, Dixie, Ga.

Application November 13, 1951, Serial No. 255,883

13 Claims. (Cl. 280—460)

This invention comprises novel and useful improvements in a planter suspension system and more specifically pertains to an attachment whereby a single row corn planter may be operatively connected with a portion of a tractor, and specifically with the power operated implement lift of a tractor for manipulating a planter.

The primary object of this invention is to provide a mechanism whereby implements such as single row corn planters may be quickly and readily attached to tractors in an improved manner for manipulating the implement by a tractor.

A further object of the invention is to provide a mounting attachment in conformity with the preceding objects which shall be readily adapted to all of the conventional and popular makes of farm tractors.

Yet another object of the invention is to provide an attachment as set forth in the foregoing objects in which the implement connected by the device to a tractor is provided ready movement in a vertical plane, both horizontally and vertically, but is restrained against twisting movement about a longitudinal axis through the implement and tractor.

These, together with various ancillary features and objects of the invention, which will later become apparent as the following description proceeds, are attained by the present invention, preferred embodiments of which have been illustrated, by way of example only, in the accompanying drawings, wherein:

Figure 6 is a fragmentary perspective view of the universal form of the attachment device of Figures 1, 3 and 4, a part of the implement frame and of the lift arm of a tractor being shown in dotted lines therein in operative position with respect to the attaching device;

Figure 7 is a perspective view of a portion of the attachment specifically adapted for use with the tractor implement lift of Figure 2.

Figure 1:
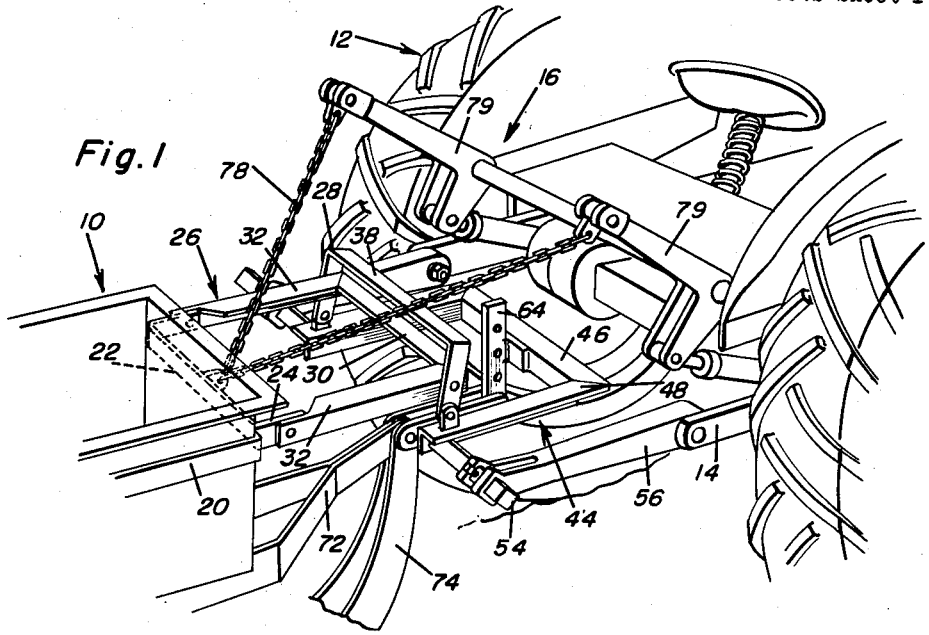
Figure 1 is a perspective view of the rear portion of a conventional tractor and its lift assembly to which a conventional single row corn planter is attached by means of the attachment comprising the present invention.
Figure 2:
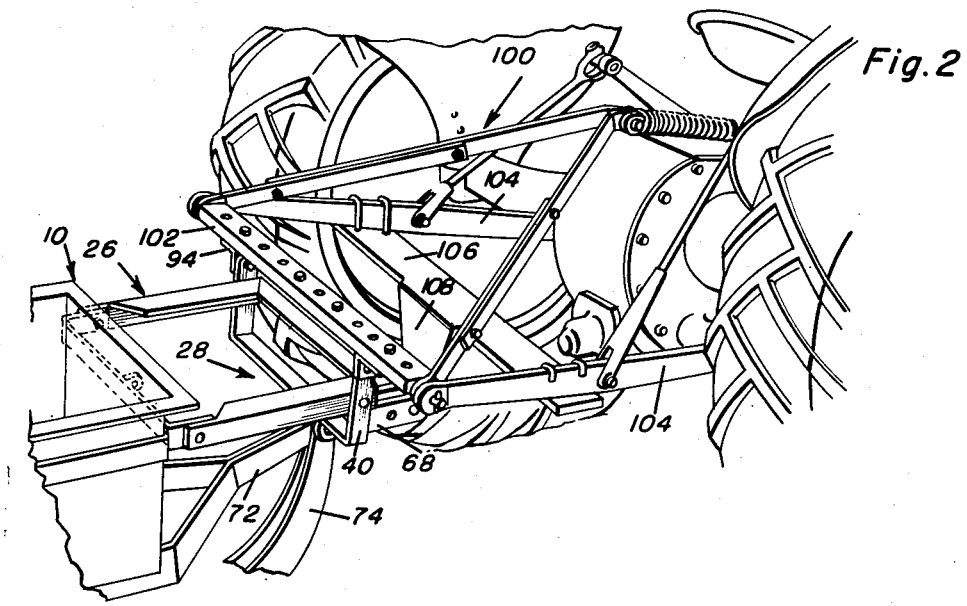
Figure 2 is a perspective view of the rear portion of a second type conventional tractor and lift assembly to which a conventional single row planter is attached by means of the attachment comprising the present invention.
Figure 3:
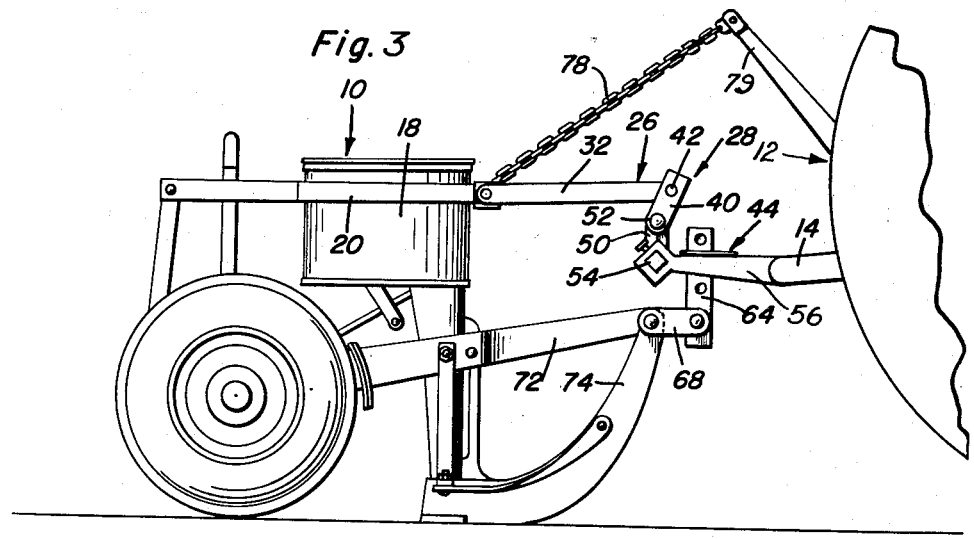
Figure 3 is a side elevational view showing a conventional single row corn planter showing the planter attachment forming a part of this invention applied thereto together with a portion of a rear end of a tractor of the type shown in Figure 1 and of a part of the mechanism for attaching the planter to the tractor.

Reference is now made more specifically to the accompanying drawings, wherein like numerals designate similar parts throughout the various views, attention being directed first to the illustration of Figures 1 and 2. In these figures, the numeral 10 designates generally in its entirety a conventional implement such as the well known Cole single row corn planter of the type which is customarily horse drawn, but which in accordance with this invention is connected by means of a novel attachment device forming the subject of this invention to the rear end of a conventional farm tractor for actuation thereby.

The portion of the tractor to which the implement such as a planter is to be connected is indicated generally by the numeral 12, being provided with the customary draft means in the form of drawbars 14 which may form a part of a power operated implement lift mechanism whereby implements may be connected with the tractor for draft thereby, and may be lifted by the power mechanism 16 of the tractor during maneuvering of the implement.

The Cole planter 10 includes a seed tank or hopper 18 having a band or strap 20 thereabout. It is to this band 20 that my novel attachment is connected.

Figure 4:
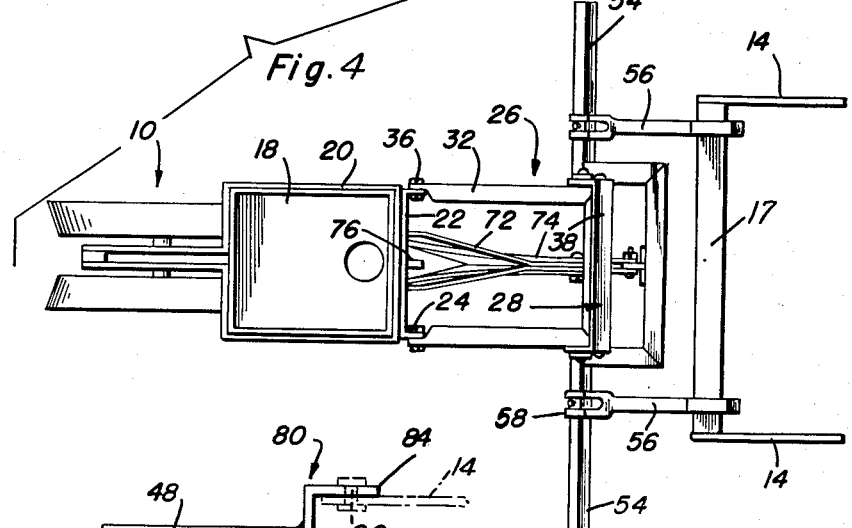
Figure 4 is a top plan view of the construction of Figure 1, showing a universal form of the attaching device connecting the planter to the tractor.

Referring now more specifically to Figures 1, 4 and 6, it will be seen that there is provided a U-shaped bracket consisting of a web 22 having a pair of parallel arms disposed perpendicularly at the ends of the web, these arms carrying the numeral 24. The web is intended to be welded to the member 20 for rigid attachment therewith, the U-shaped bracket thus constituting means whereby the implement is directly connected with the connecting attachment forming the subject of this invention. The connecting attachment includes a pair of U-shaped supports indicated generally by the numerals 26 and 28 respectively. The support 26 which may conveniently be of angle iron construction in the interest of rigidity, consists of a web portion 30 having at its opposite extremities parallel, perpendicularly extending arms 32. The free ends of these arms are adapted to be pivotally connected as by bolts 36 with the lugs or arms 24 carried by the U-shaped bracket.

The support 28 in turn is provided with a web portion 38 having at its opposite extremities a pair of perpendicular, parallel support arms 40. By means of pivot pins or bolts 42, the ends of the support arms 32 adjacent the web 30 are pivotally connected to support arms 40 intermediate the ends of the latter. The device further includes a U-shaped mounting indicated generally by the numeral 44 and which is preferably of angle iron construction, including a web member 46 having at its opposite ends a pair of parallel arms 48 which are perpendicularly disposed with respect to the web. Extending upwardly from the top surface of the arms 48 and adjacent the free ends of the latter are a pair of upstanding lugs or ears 50 to and between which the free ends of the arms 40 are pivoted as by pivot pins 52. Welded or otherwise fixedly secured to the sides of the free ends of the arms 48, are a pair of laterally oppositely extending support rods 54 which as shown are of non-circular cross-section. The support bars 54 constitute means whereby adjusting means in the form of connecting rods 56 and provided with a socketed or apertured end 58 are slidably secured upon the bars 54, being adjustable thereon as by a set screw or the like 60. The other ends of the members 56 are either pivotally mounted on the cultivator bars or beams such as 17 of Figures 4 and 6 for vertical movement therewith or are pivotally attached to the above mentioned drawbars 14 of the tractor power operated implement lift mechanism.

Intermediate the ends of the web of the U-shaped mounting 44 there is welded or otherwise secured a reinforcing plate 62 having welded or otherwise fixedly secured thereto a vertically extending plate 64, this vertically disposed member having a plurality of longitudinally disposed apertures 66 therein. A pair of connecting links 68, having apertures 70 in their opposite ends, are adjustably pivotally connected by means of the apertures 66 to the vertical plate 44, and are also detachably pivotally connected to brace members 72 and 74, see Figures 1 and 2, which extend to the bottom portion of the framework of the planter or other implement. The members 14, 17, 56, 54, 44, 64, 68 constitute means whereby the tractor tows or pulls the implement 10. It will be observed that this draft means permits free vertical and even longitudinal movement of the implement with respect to the tractor, but prevents any side sway or lateral displacement of the implement relative to the tractor, and further prevents vertical movement of the implement except upon a horizontal or level keel.

Referring now again to Figures 4 and 6, it will be observed that the intermediate portion of the web 22 is provided with a lifting or elevating lug 76 which is apertured to receive one end of a lifting chain 78, whose other end is adapted to be connected with the usual lift arms 79 with which power operated implement lifting mechanism 16 of tractors are customarily provided. This chain thus constitutes the actual means whereby the implement is raised or lowered, the entire implement pivoting about the drawbars 14, or implement tool bar 17 extending between the drawbars 14 in Figures 4 and 6, for purposes of vertically adjusting the implement during its operation. Obviously, a combined movement of the operating means attached to the upper end of the chain 78, and of the draw bars 14 will serve to position the implement and the tools carried thereby to desired elevation with respect to the surface of the ground; will permit any desired tilting of the implement, while maintaining the same upon a horizontal keel.

The foregoing construction represents an arrangement which is universally applicable to substantially all forms of tractors, but may be specifically adapted to certain particular models of tractors as set forth hereinafter. It is to be understood that the tractor lift structure shown in Figures 1, 4 and 6 is shown for purposes of illustration only, these lift structures being capable of many variations and arrangements.

Figure 5:
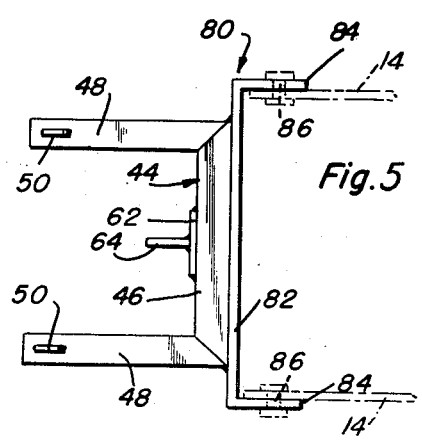
Figure 5 is a top plan view of a modified form of the tractor draft attachment forming a part of the invention, specifically adapted for use with the well known Farmall type of tractor.

Figure 5 shows an adaptation of the construction of Figure 6 for particular use with such conventional farm tractors as well known Farmall. In this arrangement, the U-shaped bracket containing the web 22 and the and the lugs or arms 24; the U-shaped supports 26, 28 are of the construction previously described and are connected to the implement or corn planter previously set forth. However, the U-shaped mounting 44 is connected with the tractor in a slightly modified manner as set forth hereinafter. This U-shaped mounting 44 includes the web 46, arms 48 and the ears 50 previously mentioned together with the welded plates 62 and 64. However, the support bars 54 with their adjustable engagement with the members 56, 58 and 60 are no longer necessary but are replaced with a U-shaped carrier indicated generally by the numeral 80. This carrier includes a web portion 82 which is welded or otherwise secured to the web 46, and which is provided with a pair of parallel, perpendicularly disposed arms 84 extending from the opposite extremities of the web 82 and from the opposite direction to the arms 48 of the mounting 44. These arms 84 are apertured as at 86 for mounting upon a conventional portion of a Farmall or John Deere tractor. The principle of operation of the attachment for connecting the corn planter or other implement to the John Deere or Farmall tractor is the same as that set forth in conection with the so-called universal attachment of Figure 6 except for the manner in which the U-shaped mounting element 44 is attached to the tractor.

Reference is now made to Figures 2 and 7 for an understanding of the manner in which the attachment is connected with the power operated implement lift of the well known Ferguson-Ford tractor. The two U-shaped supports 26 and 28 above referred to are connected to the implement in the manner set forth hereinbefore, the free ends of the support arms 32 being provided with apertures 38 whereby the same are connected with the lugs 24 by the pivot pins 36 previously mentioned. However, the support member 28 is inverted with respect to the arrangement of Figures 1 and 4, so that the free ends of the arms 40 are disposed upwardly, these being pivotally connected as by pivot pins or rivets 90 to the depending legs 92 of angle brackets 94 having apertures 96 and their horizontal, outwardly extending legs 98. By means of these brackets, the support 28 is attached to the tool bar 102 of the lift assembly 100, which bar extends between the lift arms 104 of the lift assembly. Between the lift arms and rearwardly of the tool bar 102 is mounted a flat plate 106 having a downwardly depending central tab 108. Brace members 72 and 74 of the planter are pivotally attached to the tab 108 by means of links 68. In this construction therefore the U-shaped mounting element 44 and the associated mechanism mounted thereon is no longer necessary and is not employed.

It will be observed that in each of the adaptations the same general principles of operation are employed consisting of the two U-shaped supports 26, 28 which are connected by the U-shaped brackets 22, 24 with the implement 10 through the frame member 20. However, various modified forms of U-shaped mounting means 44 are utilized in the arrangement of Figures 1, 5 and 6 for connecting the attachment device to the draft portions of farm tractors.

From the foregoing, the construction and operation of the device will be readily understood and further explanation is believed to be unnecessary. However, since numerous modifications and changes will readily occur to those skilled in the art after a consideration of the foregoing specification and accompanying drawings, it is not desired to limit the invention to the exact construction shown and described, but all suitable modifications and equivalents may be resorted to, falling within the scope of the appended claims.

Having described the invention, what is claimed as new is:

1. A device for connecting an implement having upper and lower portions to a tractor comprising a first and second U-shaped support each having a web portion and a pair of parallel arms extending perpendicularly from opposite terminals of the web portion, means pivotally connecting the free ends of the first pair of arms to an implement upper portion, means pivotally connecting the closed ends of said first pair of arms to said second pair of arms intermediate the ends of the latter, means connecting the free ends of the second pair of arms to a tractor, and mounting means for pivotally connecting the implement lower portion to a tractor to provide a draft connection for the implement.

2. A device for connecting an implement having upper and lower portions to a tractor comprising a first and second U-shaped support each having a web portion and a pair of parallel arms extending perpendicularly from opposite terminals of the web portion, means pivotally connecting the free ends of the first pair of arms to an implement upper portion, means pivotally connecting the closed ends of said first pair of arms to said second pair of arms intermediate the ends of the latter, means connecting the free ends of the second pair of arms to a tractor, said first mentioned means comprising a U-shaped bracket having a web portion adapted to be fixedly secured to an implement, perpendicular lugs extending from the ends of said bracket web and being pivoted to the free ends of said first pair of arms, and mounting means for pivotally connecting the implement lower portion to a tractor to provide a draft connection for the implement.

3. The combination of claim 2 including a lift lug intermediate the ends of said bracket web and adapted for connection with the implement lift mechanism of a tractor.

4. A device for connecting an implement having upper and lower portions to a tractor comprising a first and second U-shaped support each having a web portion and a pair of parallel arms extending perpendicularly from opposite terminals of the web portion, means pivotally connecting the free ends of the first pair of arms to an implement upper portion, means pivotally connecting the closed ends of said first pair of arms to said second pair of arms intermediate the ends of the latter, means connecting the free ends of the second pair of arms to a tractor, said last mentioned means comprising a U-shaped mounting having a web and a pair of parallel arms perpendicularly carried by the ends of said web and a means attaching said mounting web to a part of a tractor, pivot means connecting the arms of said mounting to the free ends of the second pair of arms, and means connecting the lower portion of the implement to said mounting web.

5. A device for connecting an implement to a tractor comprising a first and second U-shaped support each having a web portion and a pair of parallel arms extending perpendicularly from opposite terminals of the web portion, means pivotally connecting the free ends of the first pair of arms to an implement, means pivotally connecting the closed ends of said first pair of arms to said second pair of arms intermediate the ends of the latter, means connecting the free ends of the second pair of arms to a tractor, said last mentioned means comprising a U-shaped mounting having a web and a pair of parallel arms perpendicularly carried by the ends of said web and a means attaching said mounting web to a part of a tractor, pivot means connecting the arms of said mounting to the free ends of the second pair of arms, a vertically disposed member perpendicular to said mounting web and fixedly secured thereto and having longitudinally spaced fastening means adapted to adjustably support braces for engaging the lower portion of an implement.

6. A device for connecting an implement to a tractor comprising a first and second U-shaped support each having a web portion and a pair of parallel arms extending perpendicularly from opposite terminals of the web portion, means pivotally connecting the free ends of the first pair of arms to an implement, means pivotally connecting the closed ends of said first pair of arms to said second pair of arms intermediate the ends of the latter, mounting means connecting the free ends of the second pair of arms to a tractor, said first mentioned means comprising a U-shaped bracket having a web portion adapted to be fixedly secured to an implement, perpendicular lugs extending from the ends of said bracket web and being pivoted to the free ends of said first pair of arms, a vertically disposed member perpendicular to said mounting means and fixedly secured thereto and having longitudinally spaced fastening means adapted to adjustably support braces for engaging the lower portion of an implement.

7. The combination of claim 2 including a lift lug intermediate the ends of said bracket web and adapted for connection with the implement lift mechanism of a tractor, a vertically disposed member perpendicular to said mounting means and fixedly secured thereto and having longitudinally spaced fastening means adapted to adjustably support braces for engaging the lower portion of an implement.

8. A device for connecting an implement to a tractor comprising a first and second U-shaped support each having a web portion and a pair of parallel arms extending perpendicularly from opposite terminals of the web portion, means pivotally connecting the free ends of the first pair of arms to an implement, means pivotally connecting the closed ends of said first pair of arms to said second pair of arms intermediate the ends of the latter, means connecting the free ends of the second pair of arms to a tractor, said last mentioned means comprising a U-shaped mounting having a web and a pair of parallel arms perpendicularly carried by the ends of said web and a means attaching said mounting web to a part of a tractor, pivot means connecting the arms of said mounting to the free ends of the second pair of arms, said pivot means comprising apertured ears projecting from said mounting arms, and means on said mounting for the attachment of support braces for engaging the lower portion of the implement.

9. The combination of claim 8 wherein said mounting web has a perpendicular, vertical support post fixedly secured to its midportion for attachment to a tractor.

10. The combination of claim 8 wherein said mounting web is fixedly secured to the web of a U-shaped carrier having perpendicular parallel arms at its opposite ends, said last mentioned arms being adapted to be mounted upon a tractor.

11. The combination of claim 8 wherein said mounting web has a support member rigidly and fixedly secured thereto and adapted for mounting upon a portion of a tractor.

12. A device for connecting an implement to a tractor comprising a first and second U-shaped support each having a web portion and a pair of parallel arms extending perpendicularly from opposite terminals of the web portion, means pivotally connecting the free ends of the first pair of arms to an implement, means pivotally connecting the closed ends of said first pair of arms to said second pair of arms intermediate the ends of the latter, means connecting the free ends of the second pair of arms to a tractor, said first mentioned means comprising a U-shaped bracket having a web portion adapted to be fixedly secured to an implement, perpendicular lugs extending from the ends of said bracket web and being pivoted to the free ends of said first pair of arms, support members pivoted to the free ends of said second pair of arms for pivotally mounting the same upon a portion of a tractor, the free ends of said first pair of arms being apertured for pivotal engagement with an implement.

13. A device for connecting an implement having upper and lower portions to a tractor comprising a first and second U-shaped support each having a web portion and a pair of parallel arms extending perpendicularly from opposite terminals of the web portion, means pivotally connecting the free ends of the first pair of arms to an implement upper portion, means pivotally connecting the closed ends of said first pair of arms to said second pair of arms intermediate the ends of the latter, means connecting the free ends of the second pair of arms to a tractor, said last mentioned means comprising a U-shaped mounting having a web and a pair of parallel arms perpendicularly carried by the ends of said web and a means attaching said mounting web to a part of a tractor, pivot means connecting the arms of said mounting to the free ends of the second pair of arms, a link adjustably connected to said vertically disposed member and constituting said fastening means, and means connecting the lower portion of the implement to said mounting means.

References Cited in the file of this patent

UNITED STATES PATENTS

| Number | Name | Date |
|--------|------|------|
| 2,363,749 | Rude | Nov. 28, 1944 |
| 2,551,870 | Bridger | May 8, 1951 |
| 2,561,614 | Dixon | July 24, 1951 |